United States Patent [19]

Roesner

[11] 4,056,004
[45] Nov. 1, 1977

[54] MULTIPLE ARM PAD INSTRUMENT FOR LOGGING HIGHLY DEVIATED BOREHOLES

[75] Inventor: Raymond Earl Roesner, Houston, Tex.

[73] Assignee: Dresser Industries, Inc., Dallas, Tex.

[21] Appl. No.: 719,759

[22] Filed: Sept. 2, 1976

[51] Int. Cl.² ............................................. E21B 49/00
[52] U.S. Cl. .................................................... 73/151
[58] Field of Search ................. 73/151, 152; 181/102; 324/10

[56] References Cited
U.S. PATENT DOCUMENTS

| | | | |
|---|---|---|---|
| 2,899,633 | 8/1959 | Smith et al. | 324/10 |
| 3,798,966 | 3/1974 | Planche | 73/151 |

*Primary Examiner*—Jerry W. Myracle
*Attorney, Agent, or Firm*—William E. Johnson, Jr.

[57] ABSTRACT

A borehole instrument having four arm pad members utilizes four independent bow springs, each of the bow springs being anchored to the instrument at one of their ends and being individually slidably mounted at their other ends to the instrument. A push-pull rod activated by a solenoid within the instrument causes each of the slidable collars connected to the bow springs, respectively, to move down and thus close the instrument for easy passage through the borehole when not logging. When the push-pull rod is pulled up, each of the bow springs acts independently to cause the individual pads to make contact with the borehole wall. In an alternative embodiment, spring-driven pad linkage assemblies are likewise closed by pushing on the push-pull rod and are allowed to open and move out against the borehole wall when the rod is pulled up by action of the solenoid.

4 Claims, 7 Drawing Figures

MULTIPLE ARM PAD INSTRUMENT FOR LOGGING HIGHLY DEVIATED BOREHOLES

BACKGROUND OF THE INVENTION

This invention relates generally to apparatus for logging inclined earth boreholes and specifically to apparatus utilizing mutually independent arm pad assemblies in such boreholes.

It has become relatively common within the last few years to drill wells in the search for oil and gas and the like with a portion of the bore deviating from the usual vertical orientation thereof. The deviation or inclination may extend for a considerable distance at angles ranging to 70°, sometimes returning to the usual vertical orientation.

It is also well known in the art of drilling such deviated wells that the borehole becomes egg-shaped rather than round and that when logging such egg-shaped boreholes with an instrument having a plurality of arm pads, one or more of the pads tends not to be in contact with the borehole wall.

The four-arm instruments commonly used in the art have two opposite arms working independently of the other two opposite arms. Generally speaking, one pair of opposite arms will be powered by a single force, for example, a spring, and the other pair are powered by a separate single force for example a second spring.

As will be shown hereinafter by reference to the figures of the drawing, regardless of whether one uses weak or strong springs, one of the pads on one of the arms will lift off the borehole wall by some distance and thus produce an inaccurate log of the well.

It is therefore a primary object of the present invention to provide a new and improved apparatus for logging earth boreholes;

It is also an object of the present invention to provide new and improved apparatus for logging highly deviated boreholes; and It is still another object of the present invention to provide new and improved apparatus having a plurality of arm pad members and having means for causing each of the pad members to remain in contact with the borehole wall even whenever such borehole wall becomes irregular.

The objects of the invention are accomplished, generally, by a borehole logging instrument having separate force means driving each of a plurality of arm pad members against the borehole wall. As an additional feature of the invention, the individual arm pad members are closed to facilitate traversal of the earth borehole while either going into the borehole or pulling the borehole instrument out of the well.

These and other objects, features and advantages of the present invention will be apparent from the following detailed description taken with reference to the figures of the accompanying drawing, wherein.

Figure 1:
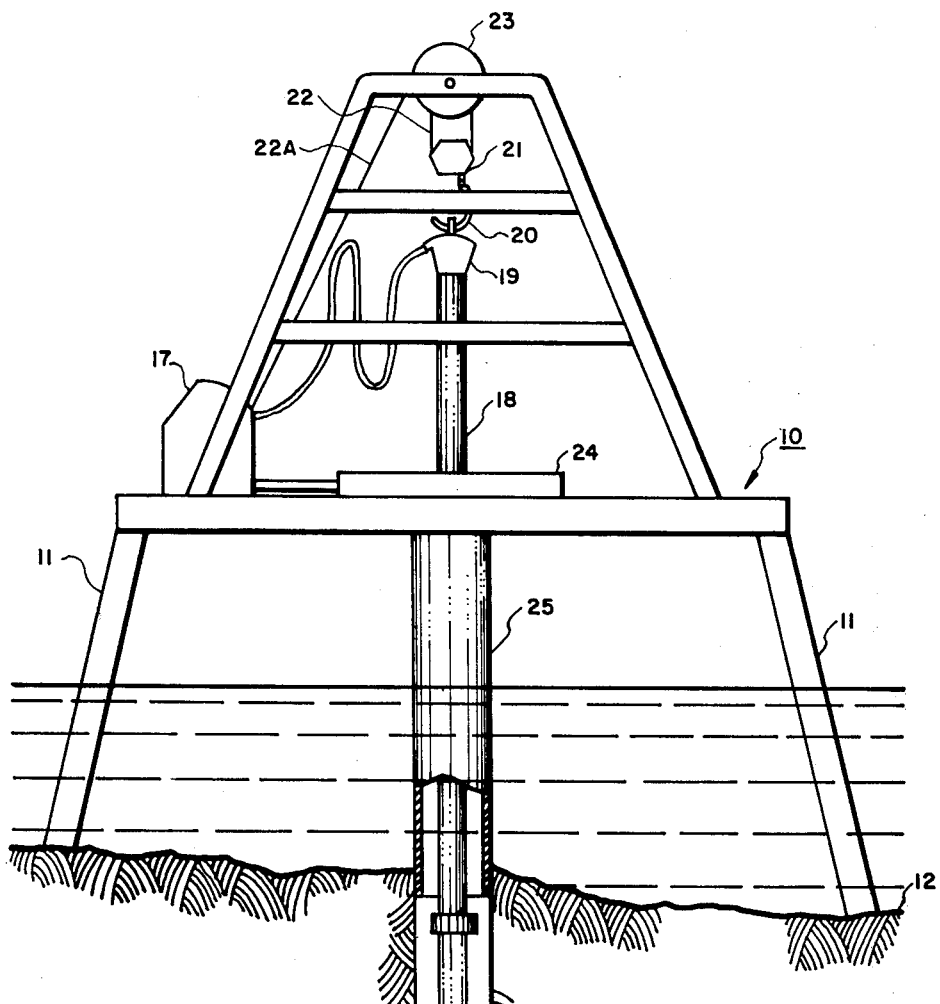
FIG. 1 is an elevated schematic view, partly in cross section, illustrating the drilling of a deviated earth borehole from an offshore platform.

Referring now to the drawing in more detail, especially to FIG. 1, there is illustrated schematically a conventional system for drilling an earth borehole having a high degree of deviation from true vertical. As is well known in the art, it is common practice to drill such slanted wells from offshore platforms. A drilling platform 10 having a plurality of legs 11 anchored on the ocean floor 12 has an earth borehole 13 drilled thereform. Within the borehole 13 is a pipe string 14, to the lower end of which is attached a drill bit 15. A surface casing 25 maintains the integrity of the borehole 13 as is well known in the art. A derrick 16 with its conventional drawworks 17 is mounted on the platform 10. The drill string 14 comprises a number of joined sections of pipe terminating at its upper end in a kelly 18, followed by a swivel 19, a hook 20 and a traveling block 21 suspended by a drilling line 22 from a crown block 23. The drawworks also drive a rotary table 24 which in turn transmits the drive to the kelly 18. One end of the line 22, namely the fast line 22a, is connected to the drawworks 17 which contains the motor or motors for manipulating the drill string. Although not illustrated, the other end of the drill line is secured to an anchor on the platform floor, that portion of the line extending to the anchor from the crown block being generally referred to as the dead line. Again not illustrated, such an anchor member normally would include a winding-on drum and can also, if desired, contain a dead line sensor for monitoring the weight on the bit, for example, as shown in U.S. Pat. No. 3,461,978 to F. Whittle, issued Aug. 19, 1969.

In the operation of the system according to FIG. 1, it is quite conventional in drilling wells from such offshore platforms to drill the initial portion of the well substantially along a vertical line from the platform and then to angle off in the further drilling of the well. Such wells after angling off will oftentimes be inclined at an angle of 60° to 70° from vertical. It is with these types of highly deviated wells that the problem presents itself as to providing a log of the formations surrounding the well bore.

Figure 2:
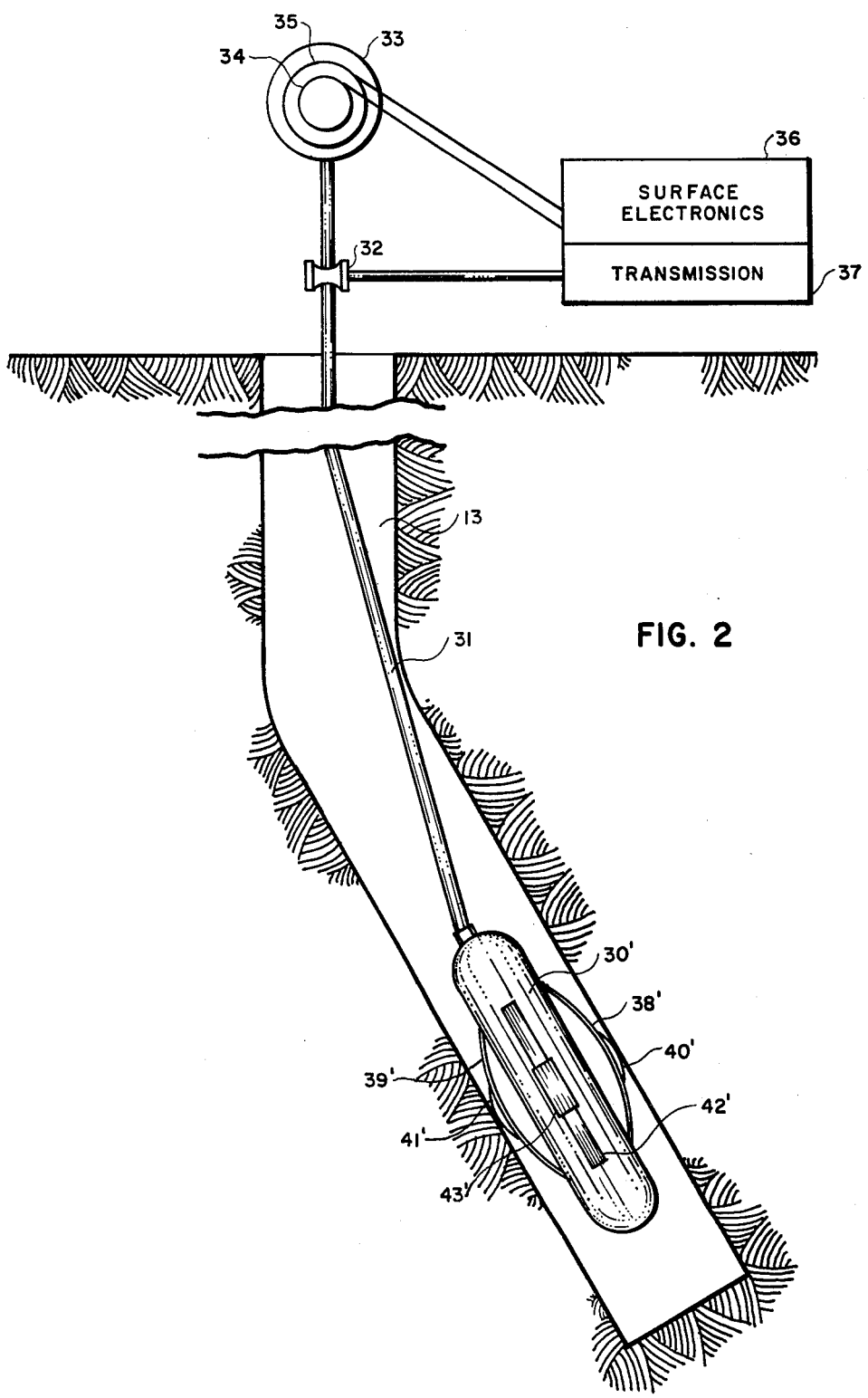
FIG. 2 is a schematic view illustrating means for causing a borehole instrument to traverse a highly deviated earth borehole in accordance with the present invention.

Referring now to FIG. 2, there is illustrated schematically means for causing borehole logging instrument 30' to traverse the earth borehole 13. A cable 31 connected to the top part of the instrument 30' passes over a measuring sheave 32 at the earth's surface and is reeled onto a hoisting drum 33 as is conventional in the art of well logging. The sheave 32 is connected to a transmission 37 which drives a recorder (not illustrated) within the surface electronics 36. The hoisting drum 33 has a pair of slip rings 34 and 35 for allowing electrical signals from the logging cable 31 to pass into the surface electronics 36. The logging instrument 30' can be of any conventional type having its individual pad assemblies pressed against the walls of the borehole 13. For example, acoustic or induction pads, or other such formation inventigative devices, can be used to provide electrical signals indicative of the earth formations surrounding the borehole in a manner well known in the art. Also as is well known in the art, such signals are caused to travel over the cable 31 from the instrument 30' to the surface electronics 36 for recording and processing.

As will be explained in detail hereinafter, the instrument 30' has four arm pad members 38', 39', 42' and 44' which cause the individual pads, for example, pads 40', 41', 43' and 45' to be pressed against thee borehole wall.

Figure 3:
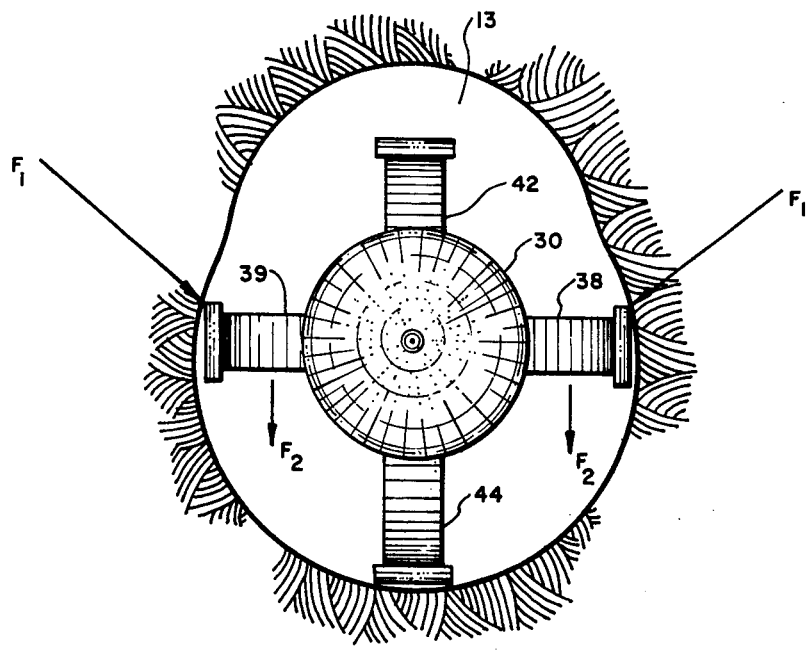
FIG. 3 is a top plan view of a borehole instrument constructed in accordance with the prior art operating within an egg-shaped borehole and having a first pair of opposite arm pad members driven by a single force and a second pair of opposite arm pad members driven by a second single force wherein one of the pad members is pulled off the borehole wall.

Referring now to FIG. 3, there is illustrated in top plan view a schematic illustration of a prior art borehole logging instrument 30 having a first pair of opposite arms 38 and 39 and a second pair of opposite arms 42 and 44, the well logging instrument 30 operating in an egg-shaped earth borehole 13. As is illustrated, a strong spring force pushing the arms 38 and 39 outward against the borehole wall, illustrated as the force $F_1$, causes the arms 38 and 39 to be pushed down by the resultant force $F_2$. This causes the arm 42 and its pad to be pulled or lifted off the wall of the borehole.

With a weak spring, the whole instrument will go to the lower side of the borehole and the pad associated with the arm member 42 will pull even further away from the borehole wall.

Figure 4:
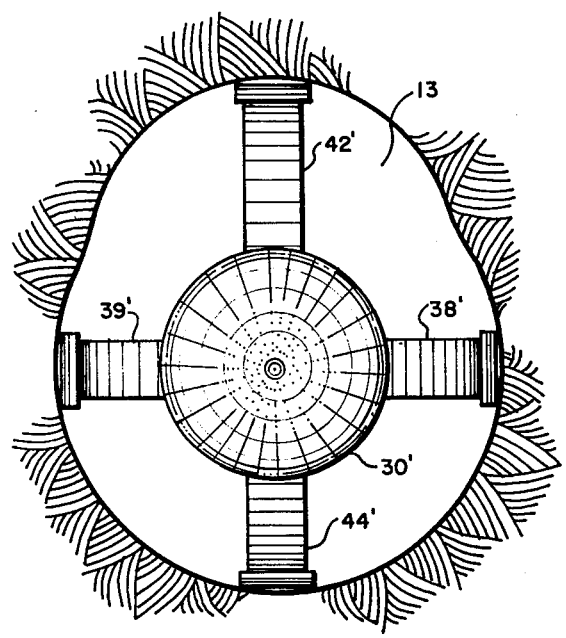
FIG. 4 illustrates a top plan view of an instrument constructed in accordance with the present invention operating within an egg-shaped borehole wherein each of the pad members is in contact with the borehole wall.

Referring now to FIG. 4, there is schematically illustated a top plan view of the borehole instrument 30' constructed in accordance with the present invention having the mutually independent arm pad members 38', 39', 42' and 44'. Because of the independent nature of the forces used to press the pad members into contact with the borehole walls, the pad members remain in contact with the borehole wall despite the egg-shaped nature of the borehole.

Figure 5:
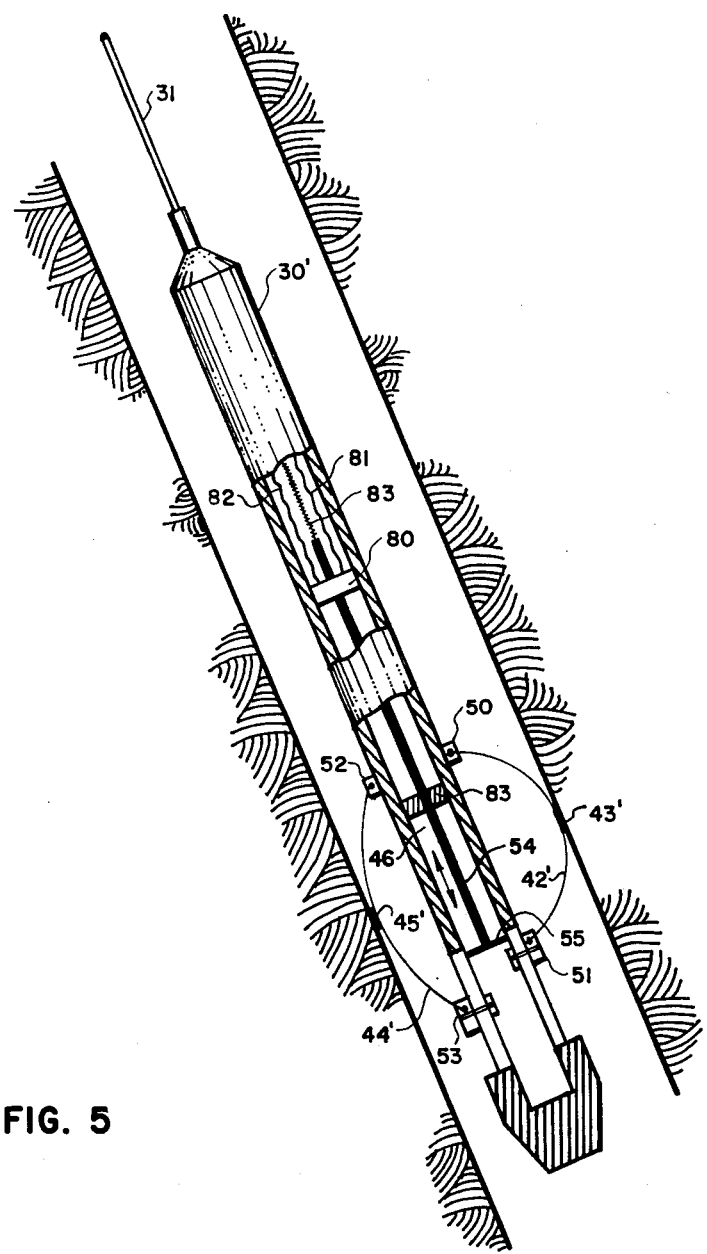
FIG. 5 is an elevated view, partly in cross section, of a well logging apparatus constructed in accordance with the present invention.

FIG. 5 illustrates in greater detail an elevated view, partly in cross section, of the borehole logging instrument 30' constructed in accordance with the present invention. The instrument30' has a cable 31 attached to its uppermost portion for allowing the instument to transverse an earth borehole as illustrated in FIG. 2.

The instrument 30' has a plurality of arm pad members, for example, the bow string arm pad members 42' and 44'. The bow spring 42' is anchored at the point 50 on the main body of the instrument 30'. The other end of the bow spring 42' is attached to a slide retainer 51 which is slidably mounted on the body of the instrument 30'. The bow spring 42' has a pad adapted to be pressed against the borehole wall. In a similar manner, the bow spring 44' is anchored at the point 52 on the main body of the instrument 30' and at its lower end to the slide retainer 53 which is slidably mounted on the body of the instrument 30'. The bow spring 44' also has a pad 45' adapted to engage the borehole wall.

The instrument 30' has a center longitudinal chamber 46 through which a push-pull rod 54 operates. The lower end of the push-pull rod 54 is connected to a disk 55 which is adapted to engage the slide retainers 51 and 53 when the rod is pushed down.

The push-pull rod 54, held up by spring 83, passes through a solenoid 80 having electrical conductors 81 and 82 controlled by the equipment at the earth's surface by way of the electrical cable 31. A spacer 83 is also provided for guiding the push-pull rod 54 in its operation.

In the operation of the apparatus in accordance with FIG. 5, when the instrument 30' is being lowered into the earth borehole or being pulled out of the borehole by the cable 31, the push-pull rod 54, by means of the solenoid 80, is pushed down and the disk 55 causes the slide retainers 51 and 53 to also move down, thus causing the arm pad members to be pulled away from the earth borehole and thereby reduce drag. When logging the earth borehole, i.e., when the pad member are desired to be put against the borehole wall, by releasing the solenoid 80 from the earth's surface, the push-pull rod 54 is pulled away from the slide retainers by the spring 83 and the spring action of the bow springs 42' and 44' causes the slide retainers 51 and 53 to slide up and the pad members to be forced against the borehole wall in good contact therewith. It should be appreciated that although only two arm pad members are illustrated in FIG. 5, the invention contemplates additional arm members, for example, four such arm pad members.

Figure 6:
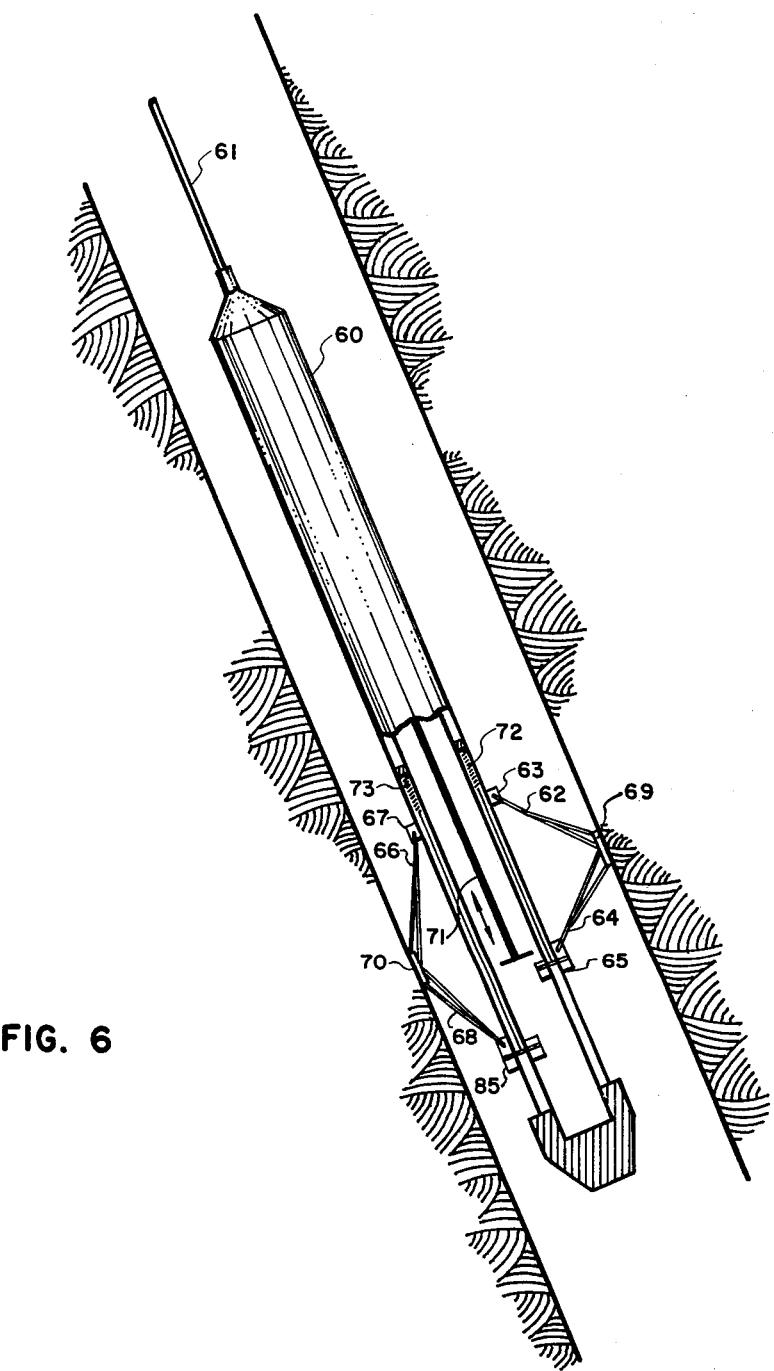
FIG. 6 is an elevated view, partly in cross section, of an alternative embodiment of a well logging instrument in accordance with the present invention.

Referring now to FIG. 6, an alternative embodiment of the present invention is illustrated wherein a borehole instrument 60 is adapted to traverse an earth borehole by means of a cable 61. Instead of using the bow springs as illustrated in FIG. 5, the embodiment illustrated in FIG. 6 uses spring-driven articulated linkage members to force the formation investigative pads 69 and 70 into engagement with the borehole wall. Such linkage means are fully disclosed in my U.S. Pat. No. 3,977,468, issued on Aug. 31, 1976, and assigned to the assignee of the present application. The disclosure therein is incorporated herein by reference. The linkage assembly 62 is anchored to the point 63 on the body of the instrument 60 and comprises a pair of articulated arms, one of which is pivotally attached to the end of the pad member 69 and one of which is pivotally attached to the center of the pad member 69. The pad member 69 also has a second pair of articulated linkage members, referred to generally by the numeral 64, which are pivotally attached to the slide retainer 65 at the one end and at their other end to the middle and end of the pad member 69, respectively. In a similar manner, the pad member 70 has linkage arm 66 attached to an anchor point 67 on the body of the instrument 60 and linkage member 68 attached to the slide retainer 85 at the other end. The slide retainer 65 is attached to the spring 72 and the slide retainer 85 is attached to a spring 73. The springs 72 and 73 have their other ends connected to the main body of the instrument 60 which are biased to pull upward on the slide retainers 65 and 85. This action, in the absence of push-pull rod 71, causes the pads 69 and 70 to be forced against the borehole wall when it is desired to log the formations surrounding the borehole. Whenever it is desired to traverse the borehole, either going in or out of the borehole, without logging the formations, the push-pull rod is activated by a solenoid as illustrated in FIG. 5 to push the slide retainers 65 and 85 down and thus pull the pads 69 and 70 away from the borehole wall and thereby reduce drag.

Figure 7:
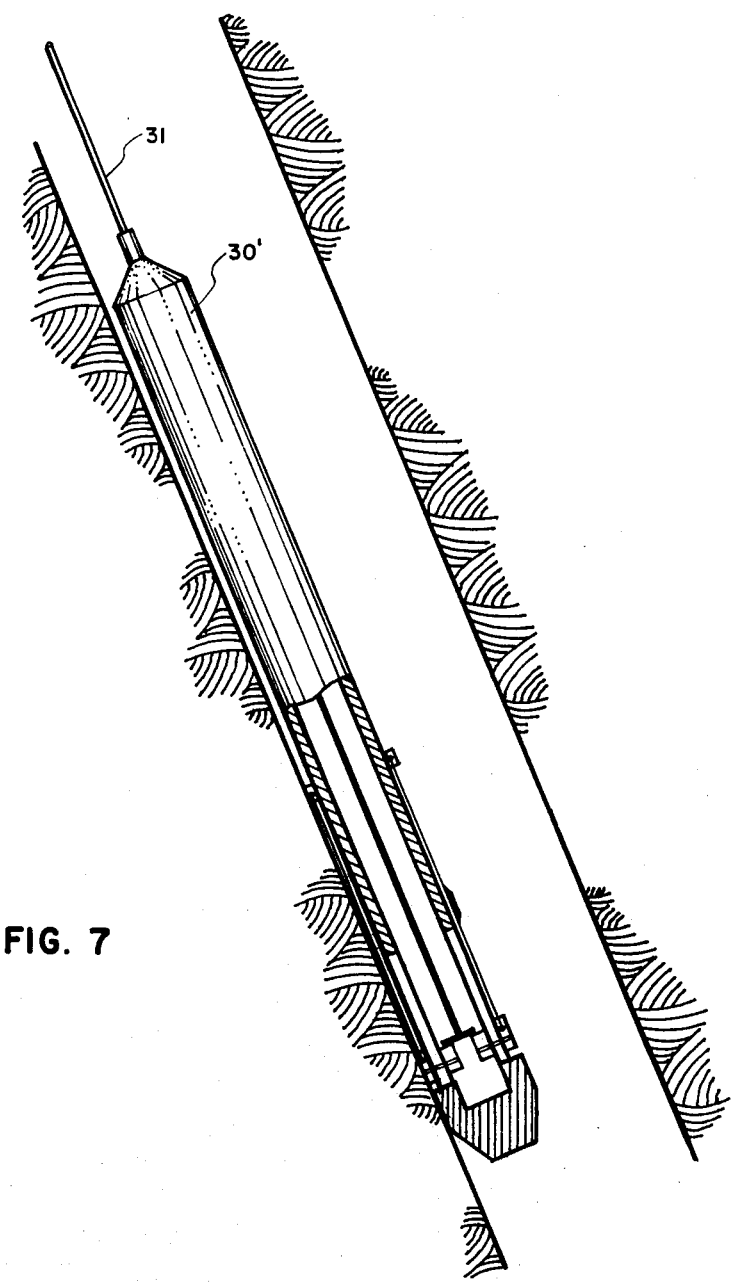
FIG. 7 is an elevated view, partly in cross section, illustrating an apparatus constructed in accordance with the present invention as it is transvering an inclined earth borehole with its arm pad members closed.

Referring now to FIG. 7, the well logging instrument 30' constructed in accordance with the present invention is illustrated as having the push-pull rod activated by the solenoid (see FIG. 5) and pushed down to cause the slide retainers to move down and thereby pull the arm pad members away from the borehole wall. This is the closed position for the arm pad members and allows the instrument to traverse the earth borehole without the pads being in contact with the borehole wall.

Thus it should be apreciated that the preferred embodiments of the apparatus for logging an inclined earth borehole have been described herein. Obvious modifications to the preferred embodiments will be apparent to those skilled in the art from a reading of the foregoing detailed specifications and drawing. For example, the present invention contemplates the use of any number of arm pad members which are mutually independent of each other as far as being extended against the borehole wall. Likewise, although the present invention is illustrated as having a push-pull rod with a disk at its lower end, the push-pull rod can be of substantially the same diameter along its length as the center chamber and operates substantially as illustrated in the preferred embodiment. Furthermore, those skilled in the art will recognize that the push-pull rod or other such means can be operated by means other than the solenoid illustrated in FIG. 5, for example, by any of the well-known means for causing movement of such a rod, for example, hydraulic, pneumatic, or any such similar means. Furthermore, while the apparatus described herein finds special utility with highly deviated borehole, the apparatus also functions quite well in vertical and near-vertical boreholes.

The embodiments of the invention in which an exclusive property or privilege is claimed are defined as follows:

1. An apparatus for investigating the formations surrounding an earth borehole, comprising:
   an elongated instrument adapted to traverse an earth borehole;
   a plurality of arm pad members carried by said instrument, at least one of said pad members having an earth formation investigative device adapted to contact the walls of the borehole, said arm pad members also each comprising: a bow spring having two ends, one of said ends being anchored to said instrument;
   a plurality of sliding members slidably mounted on said instrument, each of said bow springs having their second ends connected to different ones of said sliding members; and
   means for causing said sliding members to slide in a direction away from the anchored ends of said bow springs, thereby facilitating the movement of said instrument through a borehole.

2. An apparatus for investigating the formations surrounding an earth borehole, comprising:
   an elongated instrument adapted to traverse an earth borehole;
   a plurality of arm pad members carried by said instrument, said arm pad members each comprising:
      a borehole-engaging pad having first and second ends and a centralized pivot point;
      a first arm connected between said centralized pivot point and a fixed pivot point on said instrument;
   a second arm having one of its ends connected to said centralized pivot point;
   a third arm pivotally connected to the said first end of said borehole-engaging pad and slidably connected to said first arm intermediate the ends of said first arm; and
      a fourth arm pivotally connected to the said second end of said borehole-engaging pad and slidably connected to said second arm intermediate the ends of said second arm; and
   a plurality of sliding members slidably mounted on said instrument, each of said second arms having their second ends pivotally connected to different ones of said sliding members.

3. The apparatus according to claim 2, including in addition thereto, means for causing said sliding members to slide in a direction away from the said fixed pivot points on the instrument, thereby facilitating the movement of said instument through a borehole.

4. An apparatus for investigating the formations surrounding an earth borehole, comprising:
   an elongated instrument adapted to traverse an earth borehole;
   a plurality of pads carried by said instrument, each of said pads having earth formation investigative devices therein;
   a plurality of pad-extending means connected to said pads, respectively, each of said pad-extending means having first and second ends, said first ends of said plurality of pad-extending means being anchored to said instrument;
   a plurality of sliding members slidably mounted on said instrument, the second ends of said pad-extending members being connected to different ones of said sliding members; and
   means for causing said sliding members to slide in a direction to cause said pads to move in closer to said instrument.

* * * * *